H. RAY.
COOKING VESSEL ATTACHMENT.
APPLICATION FILED AUG. 22, 1918.
1,347,971.
Patented July 27, 1920.
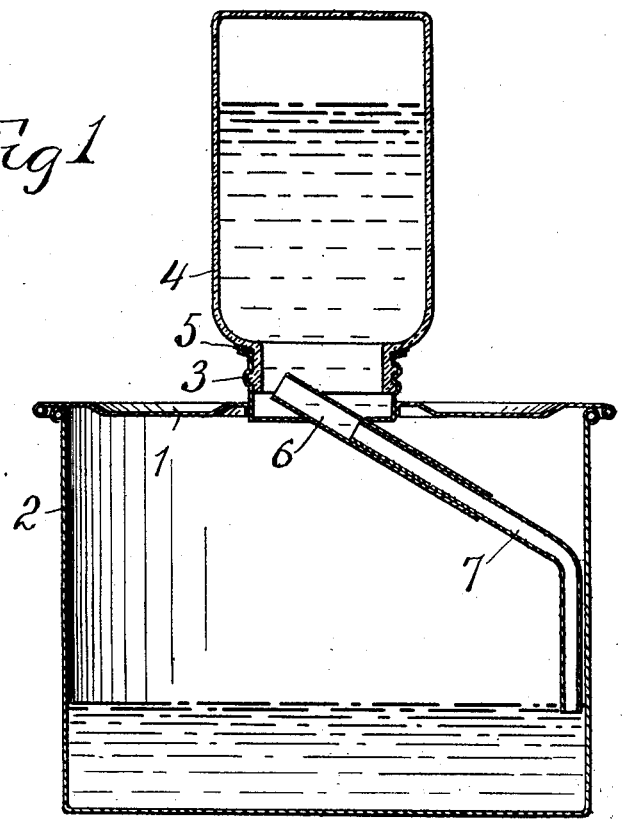
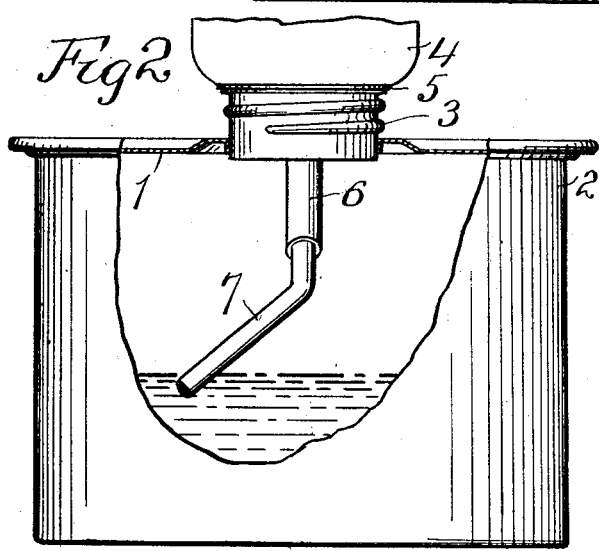
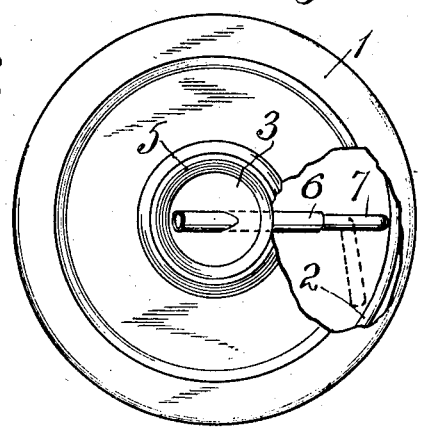

UNITED STATES PATENT OFFICE.

HARVEY RAY, OF KANSAS CITY, MISSOURI.

COOKING-VESSEL ATTACHMENT.

1,347,971.  Specification of Letters Patent.  Patented July 27, 1920.

Application filed August 22, 1918. Serial No. 250,913.

*To all whom it may concern:*

Be it known that I, HARVEY RAY, a citizen of the United States, residing at Kansas City, in the county of Jackson and State of Missouri, have invented a certain new and useful Improvement in Cooking-Vessel Attachments, of which the following is a specification.

My invention relates to improvements in cooking vessel attachments.

One of the objects of my invention is to provide novel, simple and efficient means for retaining water in a cooking vessel at a constant level, notwithstanding the evaporation of the water in the vessel by boiling.

A further object of my invention is the provision of novel means for adjustably predetermining the level at which the water is to be maintained, so as to adapt the device for the cooking of articles requiring different degrees of submergence.

Still another object of my invention is the provision of a device which can be used in connection with an ordinary "Mason" jar.

My invention provides further novel means carried by the usual kettle cover for maintaining a constant level of the water, whereby the device may be used with any kettle which the cover will fit.

The novel features of my invention are hereinafter fully described and claimed.

In the accompanying drawing which illustrates the preferred embodiment of my invention, Figure 1 is a central vertical sectional view showing my invention used in connection with an ordinary kettle and "Mason" jar.

Fig. 2 is a side elevation, partly broken away, of what is shown in Fig. 1.

Fig. 3 is a reduced plan view, partly broken away, the jar being removed.

Similar reference characters designate similar parts in the different views.

1 designates an ordinary kettle cover and 2 a common boiling kettle. For automatically keeping the water in the kettle at a constant predetermined level, I provide means, preferably supported by the cover, and comprising, preferably, the following described parts:

3 designates an inverted screw cap, which is centrally secured in a hole in the cover 1 and which is of the type usually employed in connection with the ordinary "Mason" jar or similar liquid container, designated by 4.

Interposed between the cap 3 and the jar 4 is the usual rubber ring 5 by which the cap hermetically closes the mouth of the jar.

To permit air to enter the jar 4 and water to descend therefrom as the water in the kettle 2 boils away, I provide a tubular conductor, comprising, preferably, an upper inclined tubular portion or member 6, which extends through the bottom of the cap 3, and which interiorly communicates with the cap 3 and the mouth of the jar 4, and a lower portion or member 7, which is angular and tubular, and which has its upper arm longitudinally slidable and rotatable in the member 6. The lower arm of the member 7 extends downwardly and is adapted to extend into the kettle 2. By sliding the member 7 longitudinally in the member 6, the lower end of the member 7 may be moved to positions at different distances from the cover 1 and at different heights from the bottom of the kettle 2. By rotating the member 7 in the member 6, the lower end of said member may be further adjusted as to height.

In the operation of my invention, water is placed to a suitable amount desired in the kettle 2 and the article or articles to be cooked are then placed in the kettle. The jar 4 is filled with water, after which the screw cap is screwed onto the neck of the jar, in the usual manner, the jar during this operation being disposed with its mouth up. The movable member 7 is then adjusted in the member 6 to a position in which its lower end will be at the desired height from the bottom of the kettle.

The jar 4 is then inverted and the cover 1 placed upon the kettle 2, as shown in Figs. 1 and 2.

As the water in the kettle in boiling evaporates, its level will eventually reach the lower end of the member 7, and air will pass upwardly through the members 7 and 6, the cap 3 and mouth of the jar 4, while water which is displaced by the air passes from the jar 4 through the members 6 and 7 into the kettle. When the water covers the lower end of the member 7, the flow of water will discontinue, and will not begin again until the water in boiling away uncovers the lower end of the member 7.

The inclination of the member 6 affords two functions. It prevents the trapping of air, and it permits of the lower end of the member 7 being adjusted as to height, both by sliding and rotating in the member 6.

When the water in the jar 4 becomes exhausted, the cover 1 may be removed from the kettle and the jar unscrewed from the cap 3 and refilled with water. The cap is then replaced on the jar and the cover with the inverted jar is placed upon the kettle.

I do not limit my invention to the structure shown and described, as modifications, within the scope of the appended claims, may be made without departing from the spirit of my invention.

What I claim is:—

1. In a cooking utensil, a kettle cover, a screw cap carried thereby and adapted to releasably close the mouth of an inverted jar or similar liquid container, and a conductor having an inclined tubular upper portion carried by and interiorly communicating with said screw cap, and having an angular tubular lower portion adapted to extend into a kettle supporting the cover, the angular lower portion having an arm slidably and rotatably connected with the inclined portion.

2. In a cooking utensil, a kettle cover, means carried thereby for releasably closing the mouth of an inverted jar or similar liquid container, and a conductor adapted to communicate with said mouth and to extend into a kettle supporting said cover, said conductor comprising upper and lower tubular members, the upper member being inclined and the lower member being angular in form and rotatable in the upper member to vary the height of the lower end of the lower member.

In testimony whereof I have signed my name to this specification.

HARVEY RAY.